T. MEIXNER.
FRUIT BUCKET.
APPLICATION FILED FEB. 18, 1909.
956,715.
Patented May 3, 1910.
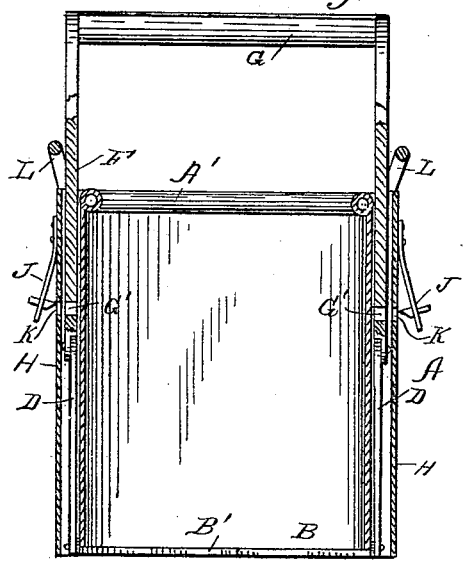
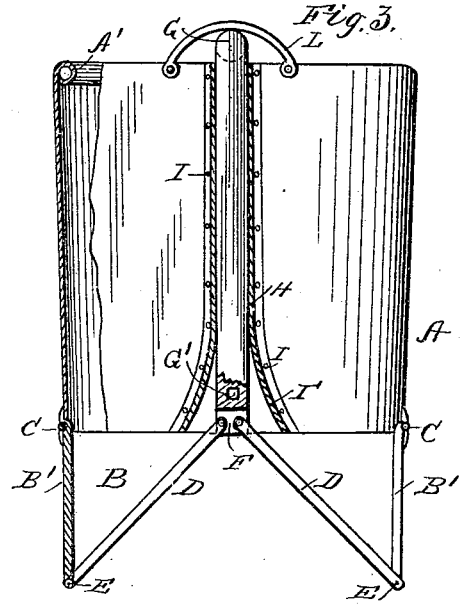
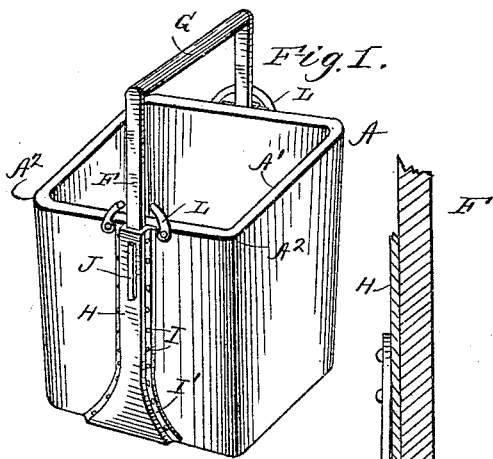
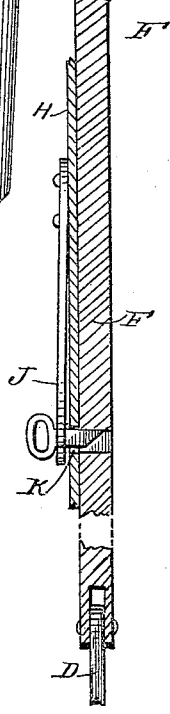
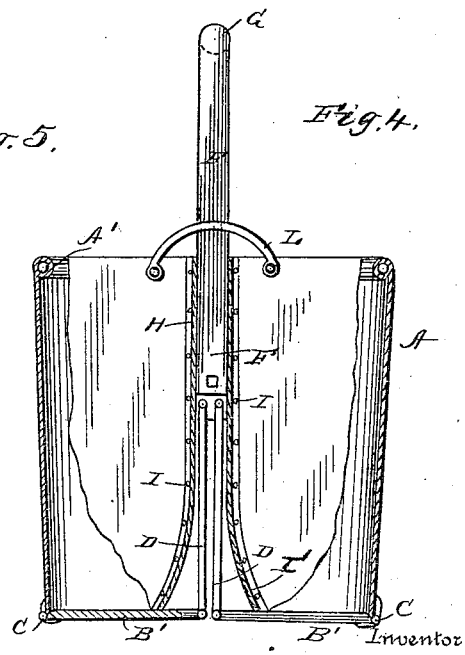
Witnesses
John Miller
Melvin Willes
Inventor
Theodore Meixner
By Geo. Wedderburn
Attorney

UNITED STATES PATENT OFFICE.

THEODORE MEIXNER, OF WINCHESTER, WASHINGTON.

FRUIT-BUCKET.

956,715. Specification of Letters Patent. Patented May 3, 1910.

Application filed February 18, 1909. Serial No. 478,688.

*To all whom it may concern:*

Be it known that I, THEODORE MEIXNER, a citizen of the United States, residing at Winchester, in the county of Douglas and State of Washington, have invented certain new and useful Improvements in Fruit-Buckets, of which the following is a specification.

This invention relates to improvements in buckets for gathering fruits, but more particularly that class of buckets that is provided with a hinged bisected bottom, and means for supporting the bottom thereof, and also means for opening the bisected bottom.

This invention further relates to the links for operating the bisected bottom, and also to extensions attached to a bail handle for operating said links.

This invention further relates to the shield attached to the outside of the fruit bucket for protecting and concealing the mechanism operating the bisected bottom thereof.

The object of the present invention is to provide a bucket of this character whereby fruit will not become damaged or crushed when discharged through the bisected bottom of a bucket as herein constructed.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, in which:

Figure 1, illustrates the improved fruit bucket in a perspective view. Fig. 2, illustrates a vertical section of the device with the bottom closed. Fig. 3, illustrates a side elevation of the device with the shield in section partly broken away and bottom open. Fig. 4, a similar view to Fig. 3, with the bottom closed. Fig. 5, an enlarged detail of the spring catch device.

This invention consists of a rectangular bucket A, which is provided with a bisected bottom B, having hinged opposing doors B', provided with hinges C. Attached to the free ends of the bisected bottom are links D, pivotally connected at E, the opposite ends of said links D being pivotally connected to pendent portions F, of a bail handle G. The aforesaid bail handle with its pendent portions are secured in shields H, which are riveted at I, to the outside of said bucket A. Said shields are flared near the bottom thereof at I', so as to allow the aforesaid links D, sufficient room laterally when said bisected bottom is open. Attached to the outsides of said shields are spring catches J, which pass through mortises K, in said shields, and also enter mortises in the pendent portions at G'. By this construction the bisected bottom is held in its closed position. The spring catches are inclined on their under side so as to engage the pendent portions at G', automatically when the bail is elevated. On the top of said bucket are ordinary handles L, for carrying the aforesaid bucket A. The top rim of the bucket has the edge turned in, in cylindrical form as indicated at A', of the accompanying drawings. This construction of the bucket rim prevents fruit from becoming bruised when accidentally contacting the edge thereof.

The corners of the bucket $A^2$, are rounded, thus giving a neat and symmetrical appearance to the device. The bucket is preferably made of galvanized iron, with the opposite sides thereof supporting the shields parallel to each other. The other two opposing sides of the bucket are tapering toward the bottom thereof. By this specific construction the fruit will not be precipitated so quickly as in the ordinary buckets, and this will have a tendency to prevent the fruit from becoming bruised. The bisected bottom affords more efficient and practical means for discharging the fruit from the improved fruit bucket. When the catches J are detached from the mortises G', the doors B' can be gradually opened, by forcing the handle G toward the handles L.

When fruit is discharged from the bucket A, the handle G, is pulled upward, which elevates the links D, and consequently also the doors B', of the bisected bottom B, the spring catches entering the openings G', in said portions F, automatically.

I do not limit this device to the exact construction herein shown and described, as the device may be modified and come within the scope of my invention.

That which I desire to secure by Letters Patent is:

1. A fruit bucket having shields secured to opposing sides thereof, pendent portions extending within said shields, a spring holding catch engaging said pendent portions, and a bisected bottom connected to said pendent portions.

2. A fruit bucket provided with opposing, inclined or tapering sides, opposing parallel sides adjacent to said opposing inclined or tapering sides, handles on said opposing parallel sides, a bail extending across the top of said fruit bucket, pendent portions extending from said bail, mortises in said pendent portions, in combination with spring catches supporting said pendent portions through the medium of said mortises, links attached to said pendent portions, and a bisected bottom connected to said links and to said tapering sides.

In testimony whereof I affix my signature in presence of two witnesses.

THEODORE MEIXNER.

Witnesses:
 F. B. KEIGLEY,
 GEO. W. DOWNS.